United States Patent
Traversat et al.

(10) Patent No.: US 6,366,954 B1
(45) Date of Patent: Apr. 2, 2002

(54) METHOD AND DATA FORMAT FOR EXCHANGING DATA BETWEEN A JAVA SYSTEM DATABASE ENTRY AND AN LDAP DIRECTORY SERVICE

(75) Inventors: Bernard A. Traversat, San Francisco; Tom Saulpaugh, San Jose; Gregory L. Slaughter, Palo Alto, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/239,596

(22) Filed: Jan. 29, 1999

Related U.S. Application Data
(60) Provisional application No. 60/085,425, filed on May 14, 1998.

(51) Int. Cl.[7] ............................................. G06F 17/30
(52) U.S. Cl. ........................... 709/220; 707/104; 713/1
(58) Field of Search .............................. 709/200, 221, 709/222; 713/1, 2, 100; 707/100, 104, 200

(56) References Cited

U.S. PATENT DOCUMENTS

| | | | | |
|---|---|---|---|---|
| 5,819,283 A | * | 10/1998 | Turkowski ................... | 707/103 |
| 6,052,720 A | * | 4/2000 | Traversat et al. ........... | 709/220 |
| 6,066,064 A | * | 4/2000 | Yang et al. ................. | 358/1.15 |
| 6,119,118 A | * | 9/2000 | Kain, III et al. .............. | 707/10 |
| 6,119,157 A | * | 9/2000 | Traversat et al. ........... | 709/220 |
| 6,122,641 A | * | 9/2000 | Williamson et al. ......... | 707/103 |
| 6,189,038 B1 | * | 2/2001 | Thompson et al. ......... | 709/231 |
| 6,253,254 B1 | * | 6/2001 | Erlenkoetter et al. ....... | 709/316 |

OTHER PUBLICATIONS

S. Kille,"A String Representation of Distinguished Names", Mar. 1995, RFC 1779.
W. Yeong, et al., "Lightweight Directory Access Protocol", Mar. 1995, RFC 1777.
Fitzgerald et al. "A directory service for configuring high–performance distributed computations" High Performance Distributed Computing, 1997, Proceedings. The 6th IEEE Inter. Symp., pp. 365–375.*

* cited by examiner

*Primary Examiner*—Dung C. Dinh
(74) *Attorney, Agent, or Firm*—Beyer Weaver & Thomas, LLP

(57) ABSTRACT

Methods, data formats, and computer program products are disclosed for exchanging configuration data between a configuration server schema residing on a configuration server and a network directory service. The exchange of data is significantly enhanced through the use of an extension to a network directory service enabling a rapid mapping between a directory service attribute and a configuration server property. A directory service entry includes multiple shadow attributes where each shadow attribute corresponds to a particular directory service attribute. The particular directory service attribute, in turn, has a corresponding property in the configuration server. The extension also includes a correspondence or path matching file that contains matches between directory service addresses and configuration server location identifier or paths. Through the use of the shadwo attributes and the path matching file, configuration data can be exchanged efficiently and rapidly between a configuration server and a network directory service.

24 Claims, 14 Drawing Sheets

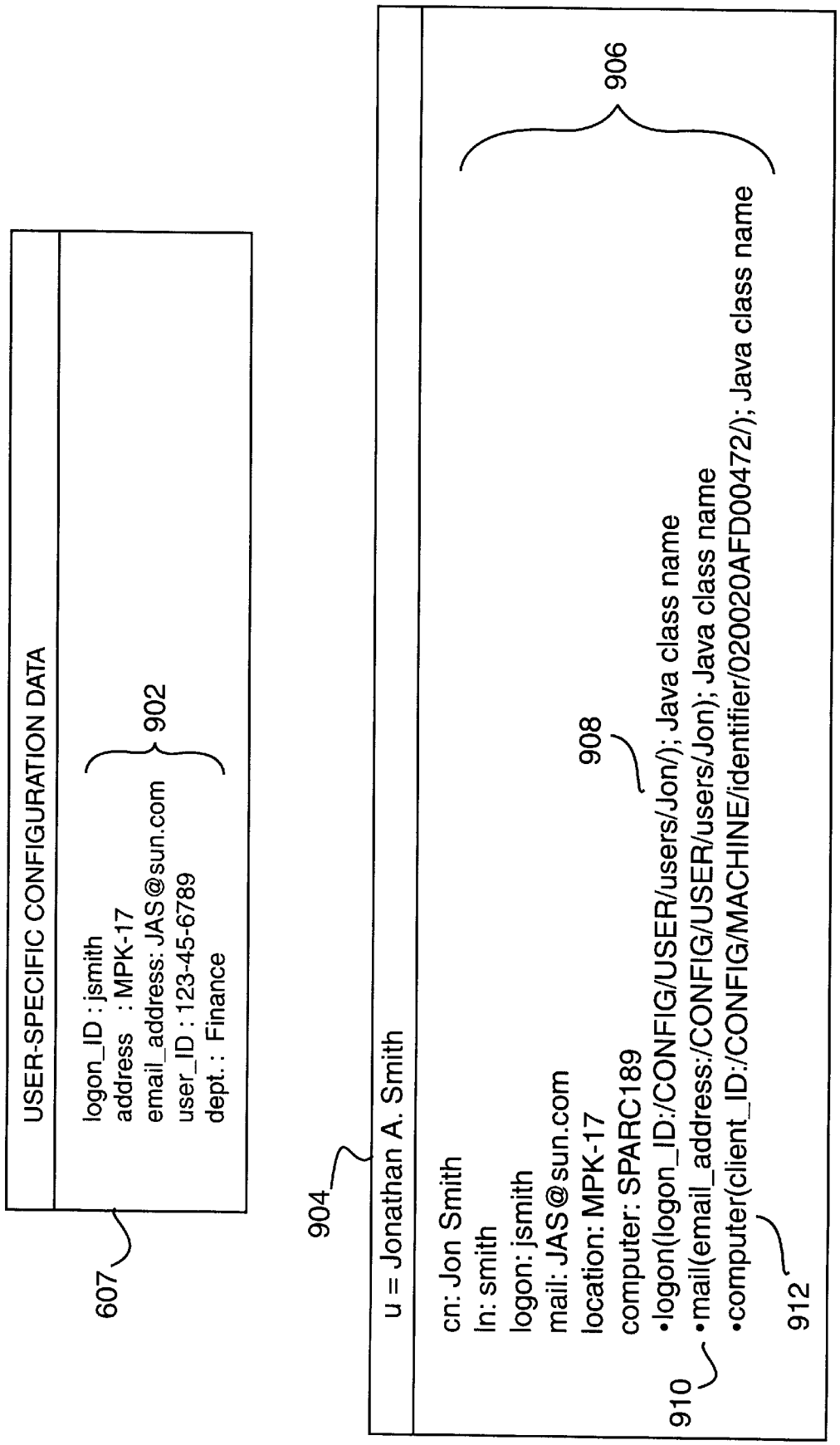

LDAP Meta Directory

TYPE1 : (attribute1a, attribute1b, . . . . attribute1n)
TYPE2 : (attribute2a, attribute2b, . . . . attribute2n)
TYPE3 : (attribute3a, attribute3b, . . . . attribute3n)
⋮

JSD/LDAP High-Level Path Map

CONFIG/MACHINE/platform/ === bu=JavaSoft; o=Sun; c=US
CONFIG/MACHINE/platform/ === bu=SunSoft; o=Sun; c=FR
CONFIG/USER/users/ === bu=SunSoft; o=Sun; c=US
⋮

METHOD AND DATA FORMAT FOR EXCHANGING DATA BETWEEN A JAVA SYSTEM DATABASE ENTRY AND AN LDAP DIRECTORY SERVICE

CROSS-REFERENCES TO RELATED APPLICATIONS

This application is related to U.S. patent application Ser. No. 09/079,500, entitled "A GENERIC SCHEMA FOR STORING CONFIGURATION INFORMATION ON A SERVER COMPUTER" (U.S. Pat. No. 6,119,157, filed on May 14, 1998; to U.S. patent application Ser. No. 09/079, 499, entitled "A PROTOCOL FOR EXCHANGING CONFIGURATION DATA IN A COMPUTER NETWORK," (U.S. Pat. No. 6,119,157, filed on May 14, 1998; and U.S. Provisional Application No. 60/085,425, entitled "JAVA SYSTEM DATABASE," filed on May 14, 1998, all of which are incorporated herein by reference.

BACKGROUND OF THE INVENTION

The present invention relates generally to computer software and computer network applications. More specifically, it relates to client-server applications and the transfer and arrangement of configuration data among components or storage areas in a computer network.

A conventional computer network involves connecting a series of personal computers commonly referred to as clients, to one or more server computers. Client computers are generally self-sufficient and contain within their resident memory much of the information needed to run user applications and communicate with a network. This includes information about their own configuration with regard to software and hardware capabilities and requirements. A client computer typically access network servers for a variety of reasons, such as accessing network software applications, email, retrieving and storing information on a network database, or accessing the Internet. However, information specific to a particular client computer generally resides on that client computer. This information can include, for example, the memory specifications and bus types, additional processors, and other hardware specifications. Since client computers are relatively self-sufficient and store their own configuration information (as opposed to storing such data on a server), the task of managing configuration and user data in addition to end user application data on a client computer has become increasingly burdensome.

While it is possible to propagate minor upgrades or fixes to applications residing on a network server to the client computers, any significant upgrade or fix, or installation of a new application that effects every client requires that each client computer be accessed and updated individually by a network administrator. With the increasing number of computers being connected to networks, ranging in the tens of thousands in some enterprises, the burden of installing major revisions or upgrades to application software or to general configuration software has become expensive, inefficient, and time-consuming. In addition, because most client computers are self-sufficient, it is difficult for users using different client computers at different locations to maintain personal preferences regarding applications and configuration data. That is, even though a user can install personal preferences as defaults on their normally-used client computer, it is burdensome to replicate these defaults on other client computers without changing defaults on those computers.

As described above, in a conventional network configuration, the process of installing new software or new applications is a static process. In such a configuration, the configuration information for each client is defined on each client machine. Thus, the network administrator statically defines each configuration on each client. In a conventional computer network, configuration information for each particular subsystem or client is hardcoded in the particular client. Furthermore, with conventional network configurations using self-sufficient clients connected to network servers, application maintenance, such as installing major upgrades to software, where the upgrade requires access to a subsystem's configuration, normally requires that the network be "brought down" to perform the maintenance.

With conventional computer networks that have multiple clients and a server in which the server contains information, that is needed by a client for various reasons, in many cases all the data on the server needed by or relevant to the client is moved from the server to the client. This can typically involve moving large amounts of data, much of which may not be used or is not necessary for the client to operate. Transferring all the data to the client is inefficient and increases network traffic. In addition, the client must have sufficient memory and storage to store all information relating to that particular client from the server. For example, devices such as PDAs and smart cards which do not have large storage capacities cannot contain in resident memory all necessary information, including configuration information that might be relevant to that particular device.

Another component of many conventional enterprise-wide networks are directory and naming services. Such services are used to store configuration and mapping information relating to network users and hardware components. This information is needed by users and components in a network to perform certain functions that require network services. Some widely used directory services are DNS (Directory Name Service), AD (Active Directory) used in the Windows NT® environment, and NIS in the Unix environment. A newer and powerful directory service that uses more current technology is the Lightweight Directory Access Protocol or LDAP, which is being used more widely in enterprise networks for directory services. FIG. 1 is a block diagram depicting how a client accesses data in an LDAP directory service. A client computer 102 in an enterprise environment 104 has an LDAP access module or add-on 106. When client 102 needs to access an LDAP directory 108, it does so directly using module 106 shown by line 110.

LDAP directory 108 is essentially a software server having a database and a software daemon (not shown). The database segment, which contains all the configuration and related data can be described functionally as a table 112 having two columns. One column contains an attribute and the second column contains one or more actual values. The attribute can be of any data category, for example, representing a user name, a logon name, a department, or hardware identifier. One advantage of directory services is the flexibility it gives network administrators to store any type of data that may need to be accessed by users or components in the network. One or more values can be associated with an attribute. For example, an attribute representing user-specific settings can have several values associated with it all, those values residing in the same value entry, separated by some type of delimiter. The structure and organization of LDAP directory 108 is well known in the field of computer network administration.

The information stored in these existing directory services, referred to as legacy systems, would have to be accessible to client computers in an enterprise network. Thus, any type of configuration repository that addresses the problems discussed above regarding the management of application and configuration data in expanding networks would have to accommodate or have access to configuration data on legacy systems such as LDAP directory services. A configuration server capable of providing client computers with configuration and user-specific data in an efficient manner must be able to exchange data with existing directory services containing configuration data.

Therefore, it would be desirable to have a system which supports distributed management of client and user configurations by storing such configuration information at a central repository. This would allow a network administrator to manage subsystem configurations from the server, and to propagate all types of changes to applications from a server. Furthermore, it would be desirable to have the central repository access legacy systems for configuration data rapidly, with minimum overhead processing, and have it done transparent to the client computers.

SUMMARY OF THE INVENTION

According to the present invention, methods, data structures, and computer readable media are disclosed for communicating data between a configuration server schema and a network directory service. In one aspect of the invention, an extension to a directory service enabling a mapping between a directory service attribute and a configuration server property is described. A directory service entry includes multiple shadow attributes where each shadow attribute corresponds to a particular directory service attribute. The particular directory service attribute, in turn, has a corresponding property in the configuration server. The extension also includes a correspondence or path matching file that contains matches between directory service addresses and configuration server location identifier or paths.

In one embodiment, the extension includes a directory service meta directory that contains a list of types in the directory service and an attribute list including attributes available for each directory type. In another embodiment each shadow attribute includes a corresponding configuration server property and a configuration server location identifier or path. In yet another embodiment, each shadow attribute includes a class name associated with the corresponding configuration server property. In yet another embodiment, the configuration server is a Java system database server containing configuration data for multiple clients and network users, and the location identifier is a series of nodes where each nodes represents a category of information. In yet another embodiment, the directory service is the Lighweight Directory Access Protocol.

In another aspect of the present invention, a format for a shadow attribute in a network directory service able to communicate with a configuration database is described. The shadow attribute contains a field for holding a configuration database property which can store a property name used in the configuration database. The shadow attribute also contains a field for a configuration database path that can be used for traversing the configuration database. Also included is a marker associated with the shadow attribute to identify the attribute as a shadow attribute.

In one embodiment, the shadow attribute format includes a configuration database class name field for storing a class name associated with the value stored in the configuration database. In another embodiment, the location identifier is a series of nodes in a hierarchical structure. In yet another embodiment, the directory service is the Lighweight Directory Access Protocol and the configuration database is a Java system database.

In yet another aspect of the present invention, a method for sending configuration data from a network directory service to a configuration database is described. One or more regular directory service entries and their corresponding values are retrieved from the network directory service and are transmitted to the configuration database. A location and property name in the configuration database for each corresponding value is determined by querying a shadow entry in the directory service in the network directory service. The corresponding values are stored in the configuration database based on the location or path determined from the shadow entry in the directory service.

In one embodiment, a context in the network directory service from which to retrieve the one or more directory service entries and corresponding values is determined. In another embodiment, each regular directory service entry is distinguished from each shadow directory service entry. In another embodiment, the shadow directory service entry contains a path on the configuration database and a property name associated with the configuration to database.

In yet another aspect of the present invention, a method of retrieving data from an LDAP server and transmitting it to a Java-based configuration server is described. A location matching file is searched for a match between a high-level path in the Java-based configuration server and a particular LDAP address. A portion of the LDAP server is searched for one or more attributes using the particular LDAP address to determine which portion of the LDAP server should be searched. One or more values corresponding to the one or more attributes is retrieved. The values are transmitted to the Java-based configuration server so that the values are made available to client computers in a Java operating system environment.

BRIEF DESCRIPTION OF THE DRAWINGS

The invention will be better understood by reference to the following description taken in conjunction with the accompanying drawings in which:

FIG. 9A is an illustration showing a format of a user-specific configuration data leaf node in the JSD server and a user entry including attributes in an LDAP directory server in accordance with one embodiment of the present invention.

FIG. 9B is an illustration of a format of an LDAP meta directory contained in the LDAP server in accordance with one embodiment of the present invention.

FIG. 9C is an illustration of a format of a high-level path map component in accordance with one embodiment of the present invention.

DETAILED DESCRIPTION

Figure 1:
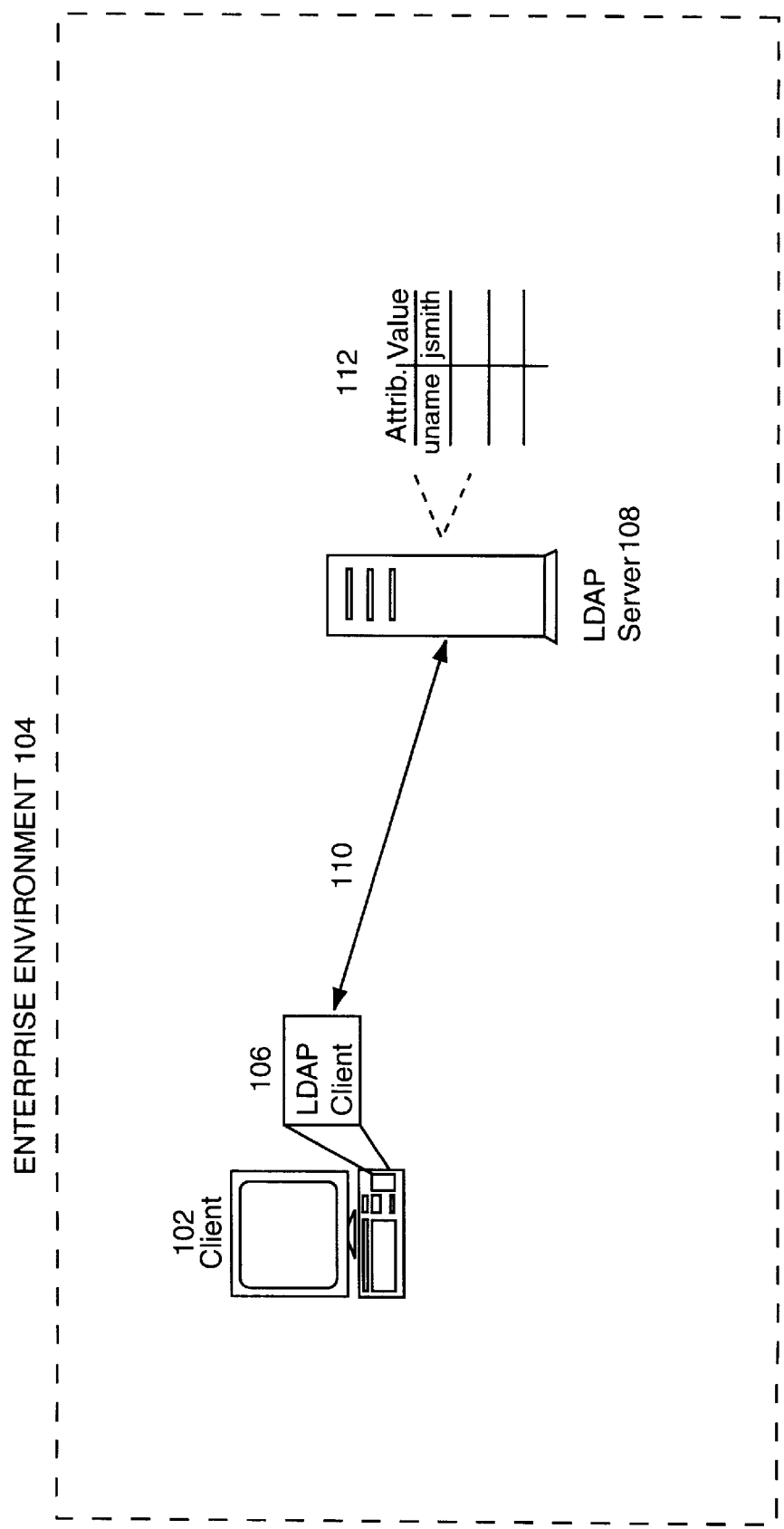
FIG. 1 is a block diagram depicting how a client accesses data in an LDAP directory service.

Reference will now be made in detail to a specific embodiment of the invention. An example of the specific embodiment is illustrated in the accompanying drawings. While the invention will be described in conjunction with a specific embodiment, it will be understood that it is not intended to limit the invention to one specific embodiment. To the contrary, it is intended to cover alternatives, modifications, and equivalents as may be included within the spirit and scope of the invention as defined by the appended claims.

Methods and systems for mapping an attribute or entry in an LDAP directory service to a configuration server schema is described in the various figures. In the described embodiment, the configuration server contains a software component referred to as a Java System Database ("JSD"). The JSD of the present invention is described in greater detail in pending U.S. patent application Ser. No. 09/079,500, filed on May 14, 1998, entitled "A Generic Schema for Storing Configuration Information on a Server Computer," and in U.S. Provisional Application No. 60/085,425, filed on May 14, 1998, entitled "Java System Database," both of which are incorporated herein by reference. As described in greater detail below, the JSD server schema is a tree structure having well-defined nodes and "leaf" nodes that contains one or more properties and corresponding data values. Thus, the location of each particular data item in the JSD server schema can be conveyed as a series of node names separated by slashes. The capability of defining a path of each property in a JSD server, as shown in FIG. 9A, allows for a "mapping" of an LDAP directory service entry or attribute to the JSD server property, of the present invention.

Although the structure and use of network directory services using the Lightweight Directory Access Protocol (LDAP), an open standard protocol that runs over TCP/IP, are well known in the art, it is helpful to describe a few specific features of LDAP that are particularly relevant to the mapping features of the present invention. A network LDAP directory service typically stores configuration data for a network that is generally more descriptive and attribute-based than data stored in conventional databases. It is generally read much more often than it is written. Directories are tuned to give quick-response to high-volume lookup or search operations. Configuration data is broadly described as data used to configure a system, such as a client computer, and data relating to user profiles for setting up a user environment, regardless of which client computer a user logs onto in a network. The JSD server schema also stores configuration data, but does not have the scalability of an LDAP server. Thus, it is more efficient to store large amounts of data on an LDAP server, making it available to all users on the network, than storing it all on the JSD server.

One feature of the LDAP server is the absolute and relative naming conventions used to define the locations of data items, referred to as attributes or keys. Of particular relevance are the absolute names used to locate attributes in the LDAP directory. An absolute name includes a series of "distinguished names" which are similar to nodes in the JSD server. Generally, the LDAP model is based on entries. An entry is a collection of attributes. Such an entry is referred to as a distinguished name ("DN"). An attribute can have one or more values and belong to a particular type. Types are typically mnemonic strings such as un or u for user name, ml for email address, or o for organization. Each type has a collection of attributes. For example, un can have attributes such as common name, last name, and logon name, among others. The DN o can have the attributes mail and fax, each followed by one or more values.

Figure 2A:
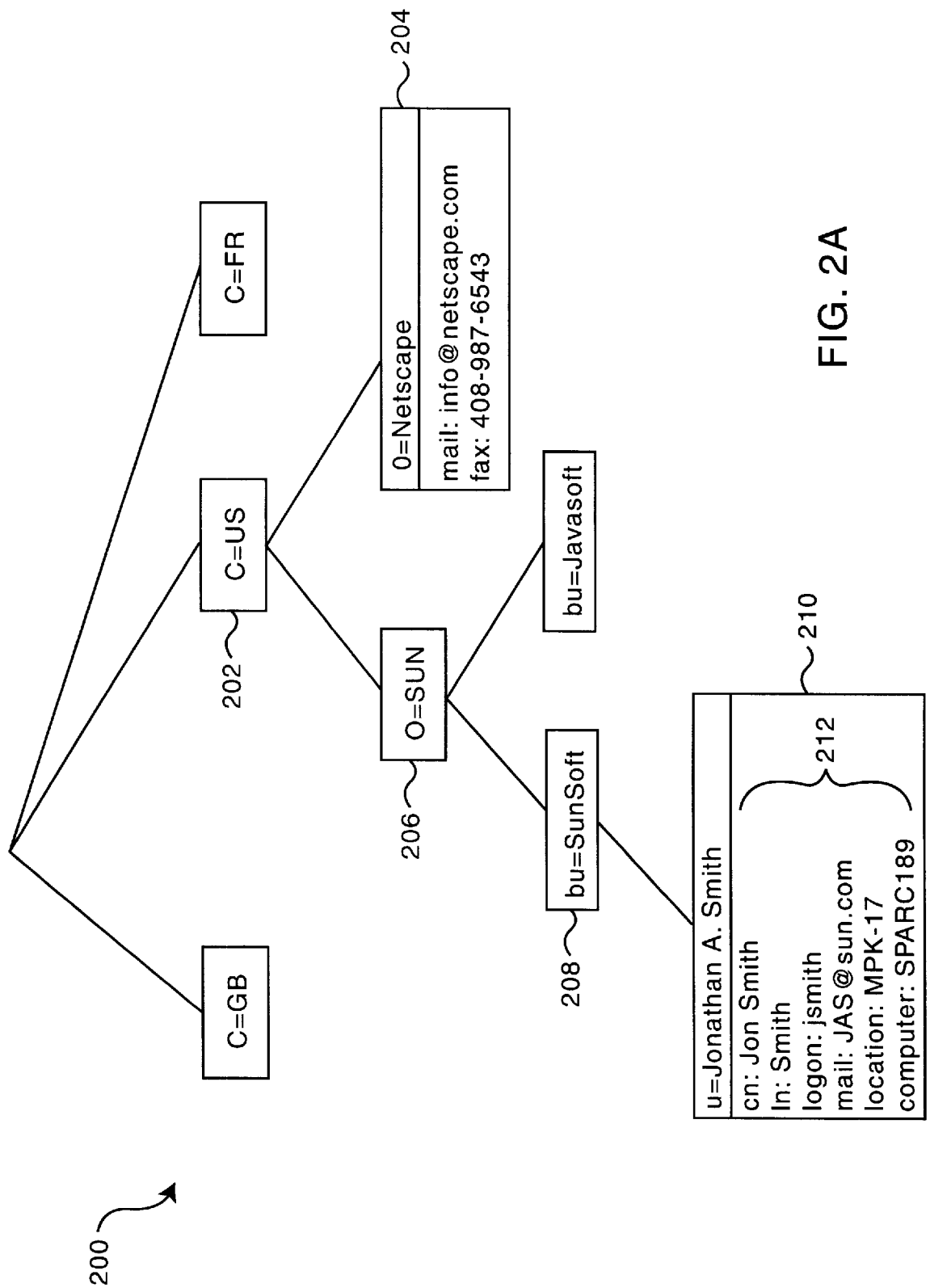
FIG. 2A is a hierarchical block diagram of an LDAP directory tree.

Entries in LDAP are arranged in a hierarchical tree-like structure that typically reflect organizational boundaries. For example, entries representing countries often appear at the top of the tree under the DN c followed by entries representing business units (bu), for example, followed by more specific entries representing anything from printers, client computers, or network users. FIG. 2A is a hierarchical block diagram of an LDAP directory tree. A more detailed description of the LDAP open standard, its data organization, and use of distinguished names can be found in Request for Comments ("RFC") Number 1777, titled "The Lightweight Directory Access Protocol," by Wengyik Yeong, Tim Howes, and Steve Kille, March 1995, and in RFC 1779, "A String Representation of Distinguished Names," by Steve Kille, March 1995, both of which are incorporated herein by reference.

A directory tree 200 shown in FIG. 2A has three nodes corresponding to a top-level DN for country represented by the mnemonic c. A node 202 represents the United States. The mnemonic c is also referred to as a type. Node 202 has two nodes, 204 and 206, stemming from it that belong to the DN o representing organization. Node 204 depicts Netscape as an organization. Netscape, having a type o, has two attributes shown in this example: "mail" and "fax" followed by their respective values. Node 206 depicts another organization, Sun, with two nodes stemming from it. Node 206 can, and very likely does, a list of attributes (all of type o) similar to node 204 but are not shown in the figure. The next level DN is bu which represents the business unit type. Under Sun node 206 are two nodes, both of type bu. A node 208 depicts the "SunSoft" business unit. SunSoft also has a collection of attributes, all of type bu not shown in FIG. 2. Under node 208 is a node 210 for a user, Jonathan A. Smith, represented as DN u. The SunSoft business unit can have many nodes similar to node 210 depicting all the network users in that business unit. The u type has a list of attributes 212. Each attribute is followed by one or more values. In many implementations of LDAP these values must be in either string or binary form. In the example shown in FIG.

2A, there are no more DNs below the u DN. One advantage of directory services implemented with LDAP is the flexibility to store all types of information, such as data pertaining to hardware components, user settings, startup data, etc.

An LDAP directory typically includes multiple contexts. When a new context is created, one absolute name, or hierarchy of DNs, described in FIG. 2B, for that context is defined. A context is defined to address a specific function. Some examples of contexts are "client boot-up," "user-specific preferences," "financial reports," or "engineering department data", to name a few. Contexts can be seen as high-level segments that make up the database portion of an LDAP directory. For example, access restrictions to data in an LDAP directory by clients is set at the context level.

Figure 2B:
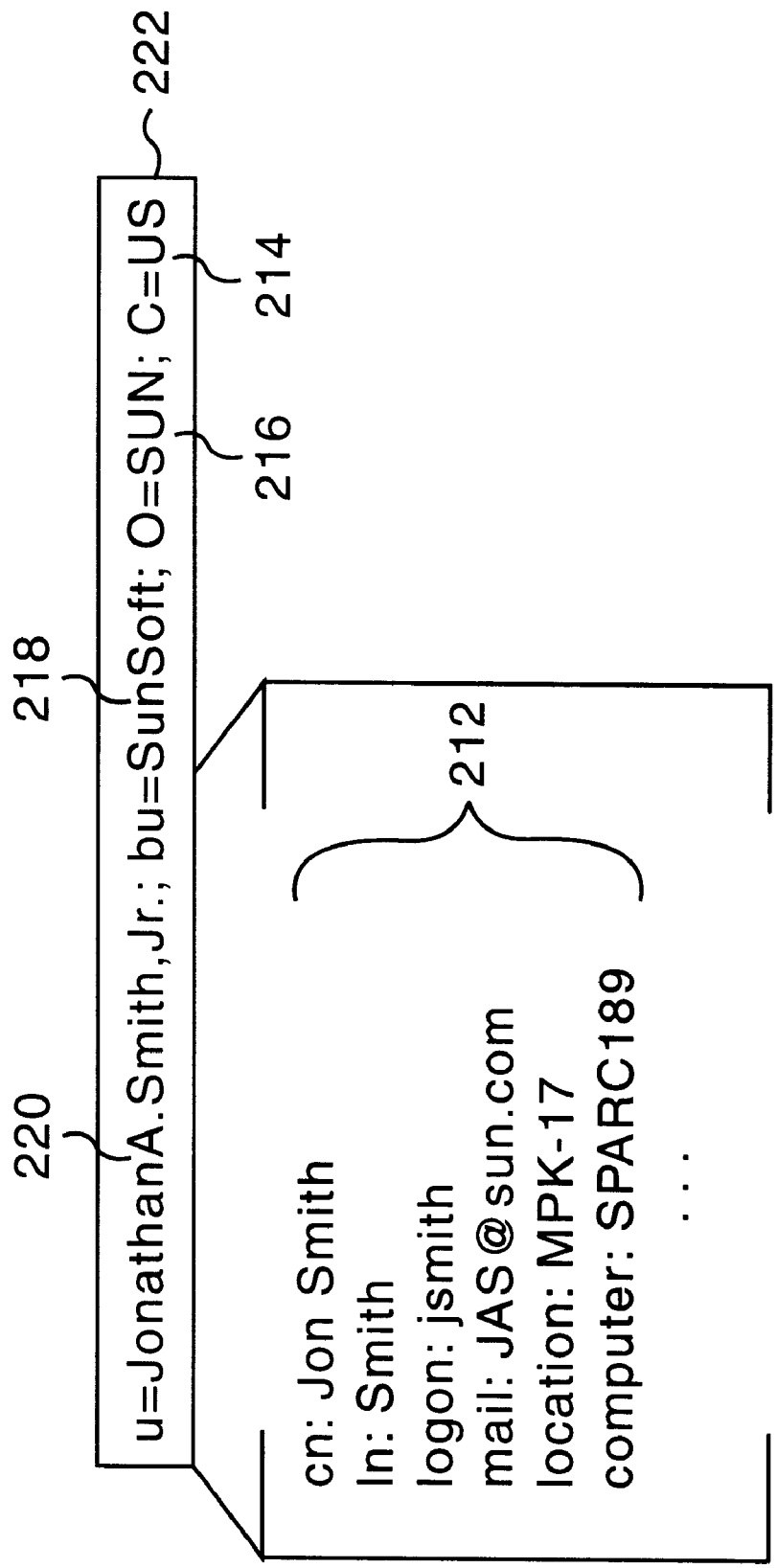
FIG. 2B is an illustration of a name schema and associated attributes reflecting the hierarchical structure of FIG. 2A in an LDAP directory service.

Each context has one absolute name schema defined (typically by a network administrator) when a context is created. The absolute naming schema or convention in LDAP is a list of DNs. FIG. 2B is an illustration of a name schema and associated attributes reflecting the hierarchical structure of FIG. 2A in an LDAP directory service. The naming configuration or hierarchy begins at distinguished name "c=US" 214 on the right side of the name schema. The DN c can have any one of a number of values representing different countries. The next distinguished name o=Sun 216 represents the next level down in the hierarchy. In this example, DN o represents "organization" and can have string values representing other organizations or companies. The DNs to the left get more specific: bu representing business unit 218 and u representing a user 220. Each distinguished name or type has a set of attributes. For example, distinguished name u=Jonathan A. Smith 220 has a set of specific attributes 212 described initially in FIG. 2A. The entire string of DNs 222 is referred to as an absolute address or sometimes a full DN.

As mentioned above, a portion of configuration data for client computers, users, and other components in a network is stored in the JSD server schema. This is in contrast to conventional networks where configuration data for a client is hardcoded or stored on the client machine. The JSD server schema allows a network administrator to manage configuration information for each of the computers in an enterprise network from a central repository. Thus, any software updates, version upgrades, or installation of new applications that require knowledge of and access to a subsystem (e.g., client computer) configuration can be implemented from the central repository and propagated to the individual subsystems. Users on client computers, for example, do not have to exit applications and, moreover, the network does not have to be brought down for maintenance in order to install or propagate the new upgrade or version of the application.

Figure 3:
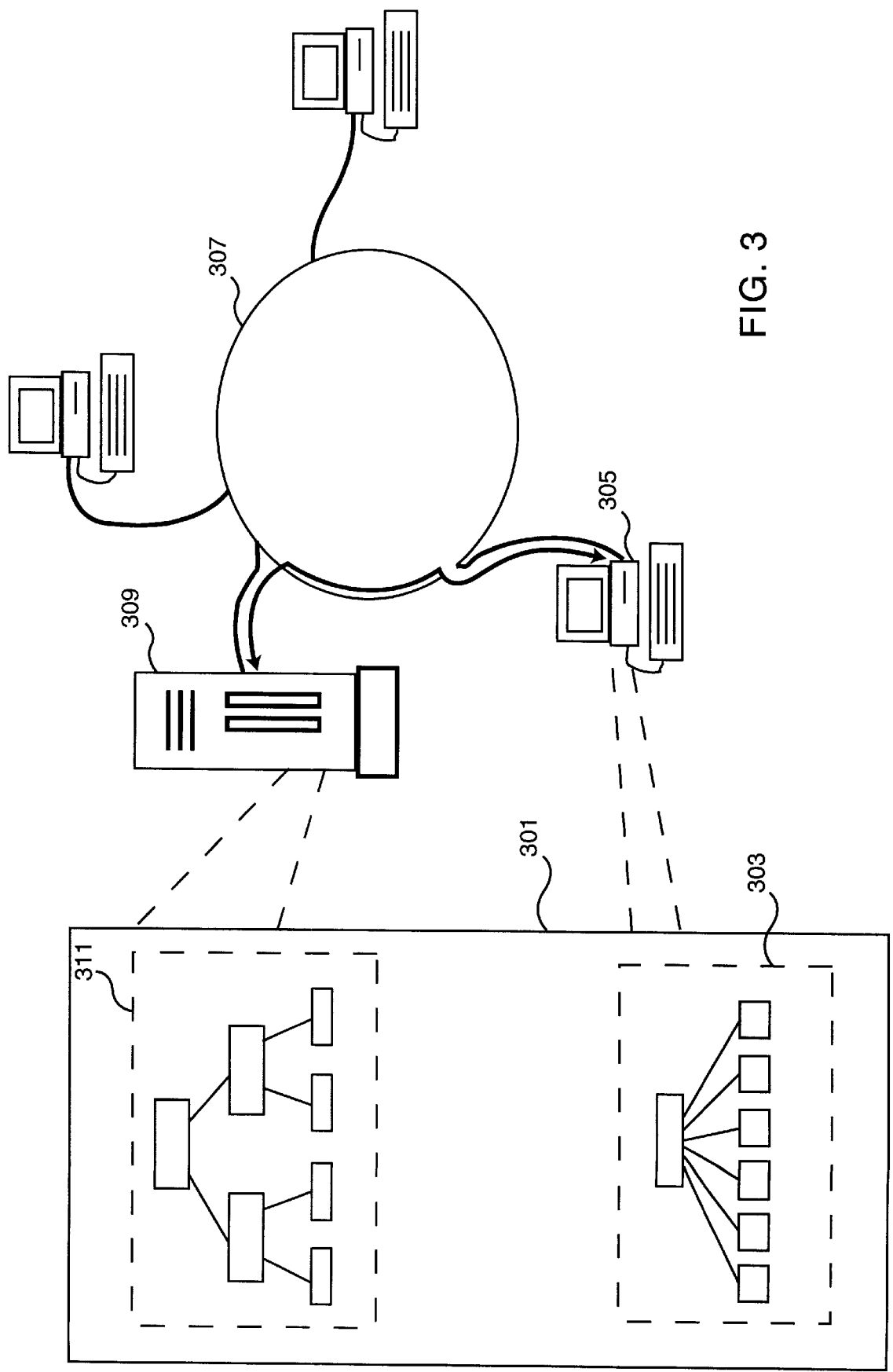
FIG. 3 is a schematic diagram depicting components of a computer network having a system-wide data schema in accordance with one embodiment of the present invention.

FIG. 3 is a schematic diagram depicting components of a computer network having a system-wide data schema in accordance with one embodiment of the present invention. In the described embodiment, the system-wide data schema is implemented as a Java System Database or JSD 301 that consists of a client schema 303 which resides on a client machine 305 as part of network 307. A JSD server schema 311 resides on a server computer 309, part of network 307. As mentioned above, it is JSD server schema 311 on server 309 ("JSD server") that communicates with an LDAP directory service. Thus, JSD server schema 311 is described in detail below.

Figure 4:
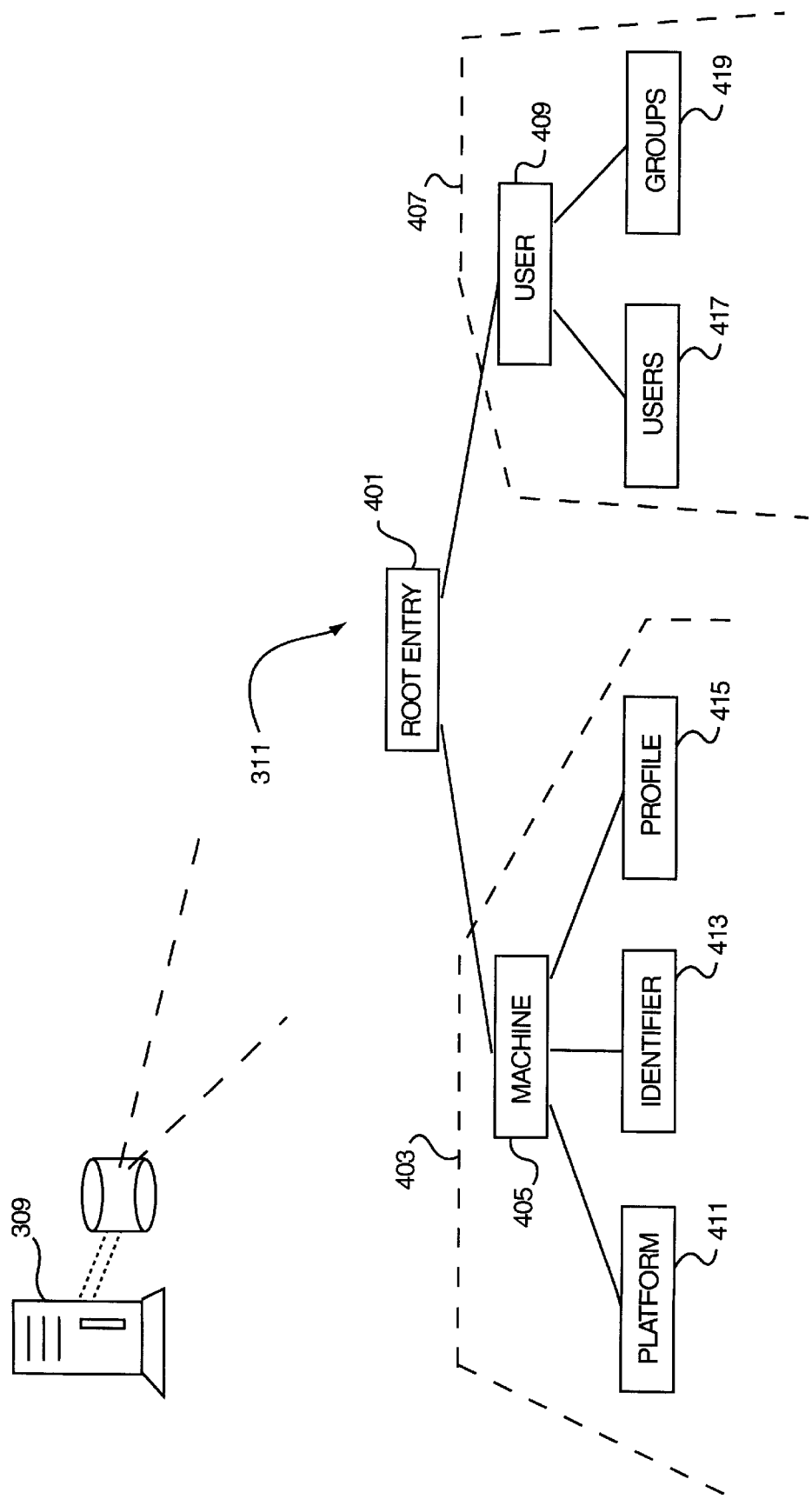
FIG. 4 is a block diagram showing a structure of a JSD server schema in accordance with one embodiment of the present invention.

FIG. 4 is a block diagram showing a structure of a JSD server schema in accordance with one embodiment of the present invention. It shows server computer 309 and server schema 311 of FIG. 3 in greater detail. At the top of an n-way tree is a root entry node 401 referred to as "CONFIG" in the described embodiment. There are two namespaces in the server schema. Area 403 represents a MACHINE namespace having a machine node 305. Area 407 represents a USER namespace having a user node 409.

In the described embodiment, MACHINE namespace 403 includes three categories: platform 411 identifier 413, and profile 415. Under platform 311, for example, are a number of entries that refer to specific computer manufacturers. In other embodiments, MACHINE namespace 403 can have more or fewer sub-categories depending on the platform and requirements of the network. This is shown in greater detail in FIG. 5.

Figure 5:
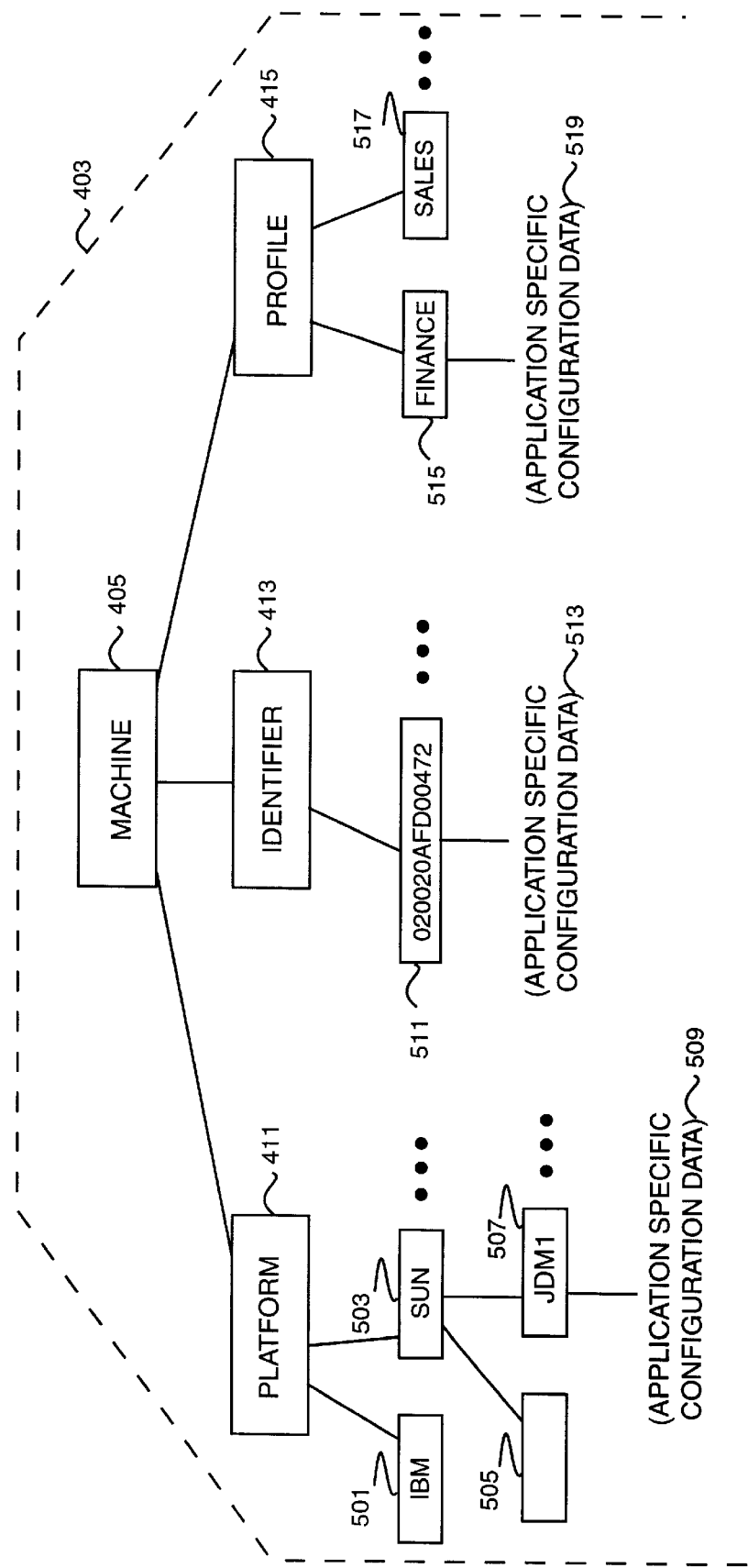
FIG. 5 is a schematic diagram depicting a hierarchical structure of a MACHINE namespace in a server schema in accordance with one embodiment of the present invention.

FIG. 5 is a schematic diagram depicting a hierarchical structure of MACHINE namespace 403 in server schema 311. Under platform 411 category are generally vendor-specific sub-ranges 501 and 503. The number of entries at this level can depend, for example, on the number of components from different computer manufacturers used in the network. Under a particular manufacturer such as Sun Microsystems are two entries 505 and 507, which refer to a particular model or type of computer made by Sun Microsystems. For example, under Sun there is the computer type JDM1. Under each computer model are leaf nodes, such as node 509 that specify application configuration data for that particular type of computer. Application configuration data in the leaf entries contain all possible configurations applicable to the particular computer indicated in the parent entry (e.g., node 507).

Under the identifier category 413 are entries that contain a unique identifier, such as shown in node 511 for each computer in network 307 of FIG. 3. In the described embodiment, a media access control (MAC) address for each computer is used as a unique identifier. Leaf node 513 under client identifier 511 contains application configuration information specific to that particular computer. Configuration data 513 is distinguishable from configuration data 509 under platform category 411 in that the data 513 under identifier 413 applies to a specific computer as configured by a particular user. In the described embodiment, there are cross-references (not shown) among unique identifiers 411 under the identifier category and entries under platform category 411. That is, there is a reference to a particular type of computer from a specific identifier. This allows the server to determine what platform or type of computer a particular unique identifier refers to.

Under profile category 415 are entries that describe particular categories or uses of computers in the network. The configuration information for the particular profiles which can describe, for example, departments within a company, is contained under profile category 415. Examples are shown at nodes 515 and 517 for Finance and Sales profiles. Under Finance node 515 is application specific data 519 containing data related to the Finance profile. Similar to references from the unique identifiers to the platform entries, there is also a reference from specific identifier leaf node 513 to profile entry, node 519 if needed. That is, if a particular computer has a certain profile, such as a computer used in the accounting department or a computer that is used strictly as a receptionist terminal, there is a reference from that computer's identifier to the appropriate profile entry.

Figure 6:
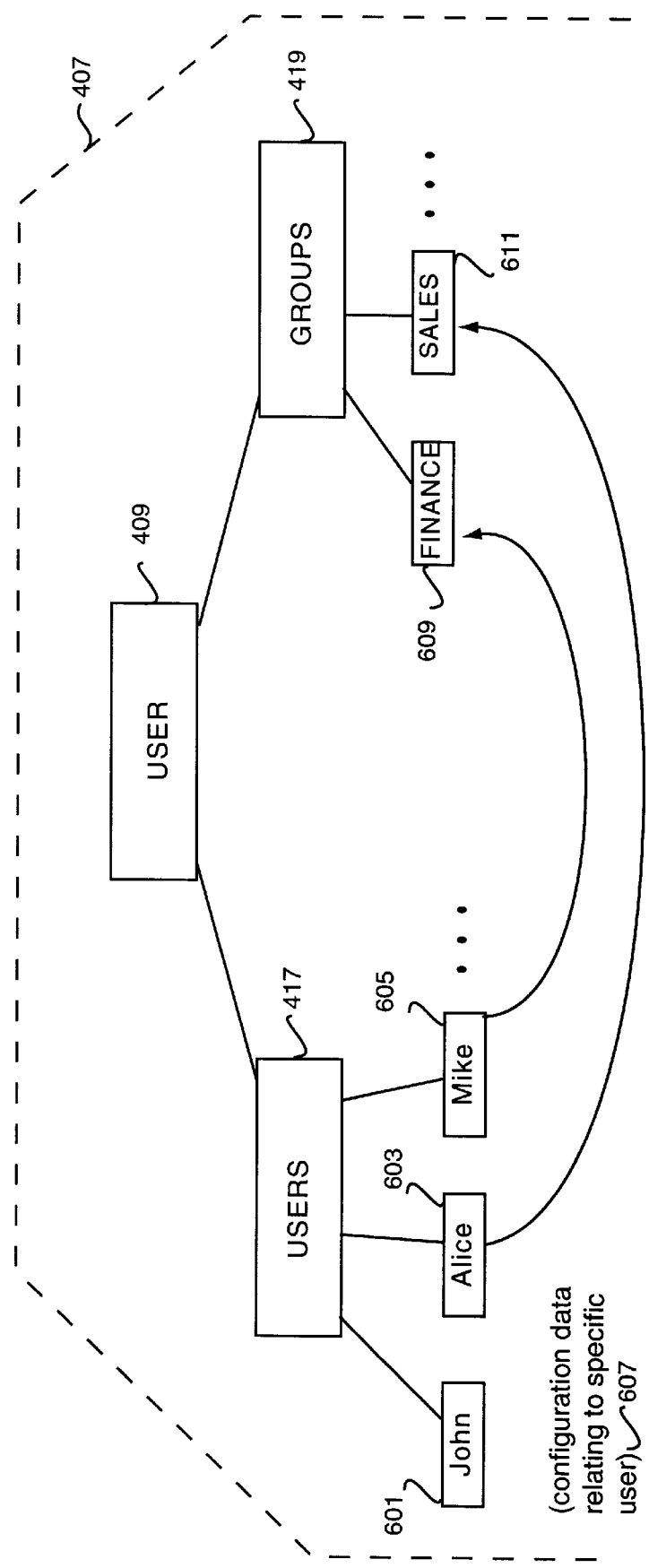
FIG. 6 is a schematic diagram depicting a USER namespace in accordance with one embodiment of the present invention.

FIG. 6 is a schematic diagram depicting a USER namespace in accordance with one embodiment of the present invention. In the described embodiment, USER namespace 407 has two categories: users and groups. Users category 417 represents names of individual users on network 307 such as shown in nodes 601, 603 and 605. Under each user's individual node is specific configuration data containing personal preferences of that individual user, shown at leaf node 607. For example, in a word processing application, a particular user preference can include a default font and format settings for documents. This category allows an individual user to use any computer on network 307 and have that user's personal configuration (i.e., personal settings) known to that computer. For example, if the user brings up a word processing program, the user's preferences will be the default instead of the default of the normal user of that computer.

The other category in USER namespace is groups category. This category contains entries relating to particular groups of users. Groups 419 can include a variety of categories such as departments within a company or categories that distinguish employees in a company from other employees such as shown at nodes 609 and 611. In the described embodiment, there are reference pointers between individual users 603 and 605 under the users category 417 to one or more particular groups where appropriate.

Figure 7:
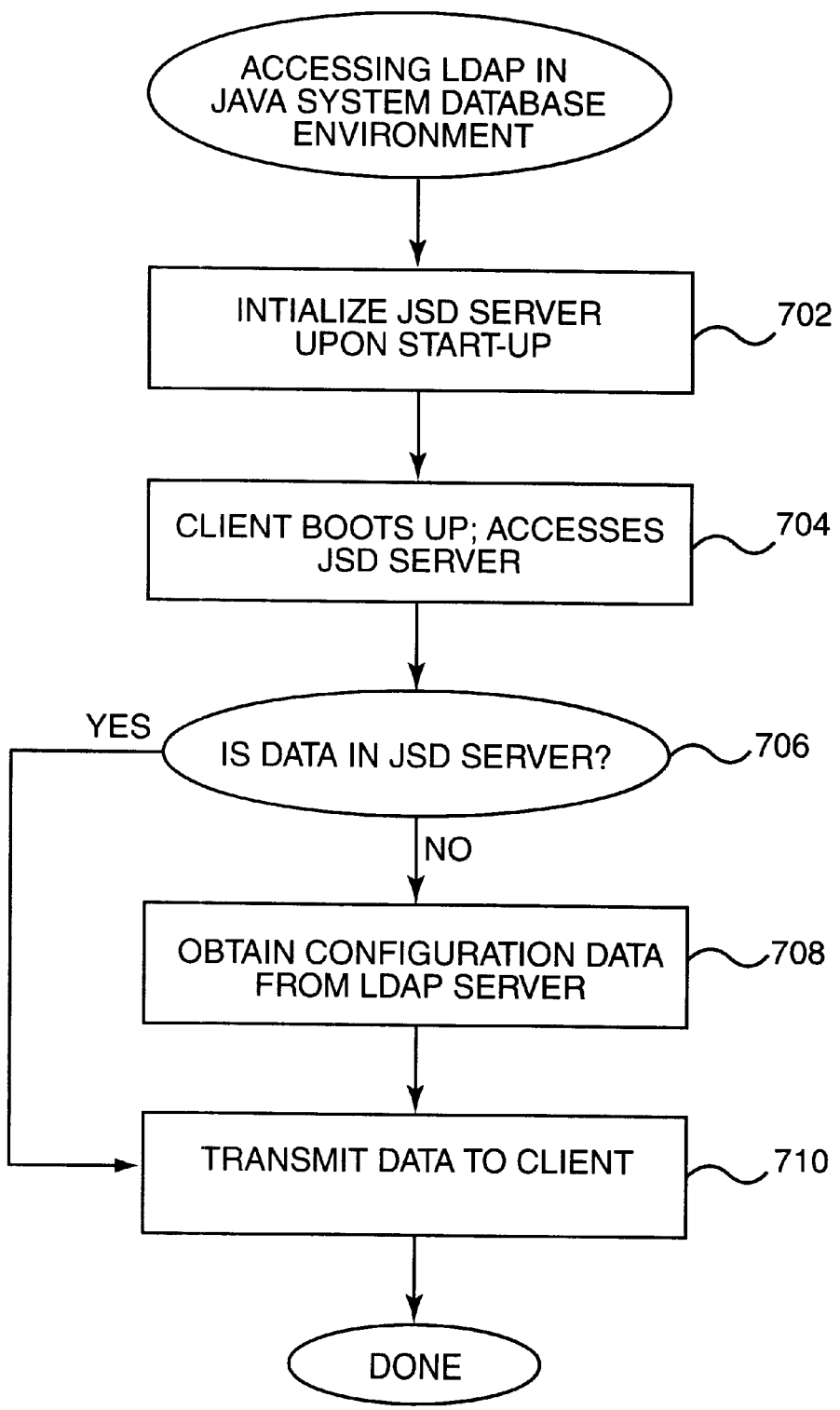
FIG. 7 is a flow diagram of a process for accessing data in an LDAP directory in a Java system database environment in accordance with one embodiment of the present invention.

FIG. 7 is a flow diagram of a process for accessing data in an LDAP directory from a configuration server operating in a Java system database environment in accordance with one embodiment of the present invention. The flow diagram of FIG. 7 uses a configuration server configured with a JSD server schema as described in FIGS. 3–6 above to hold client network, and user configuration data. At step 702 the JSD server imports or caches configuration data from the LDAP directory server upon boot-up of the JSD server. At this step, the JSD server schema goes through an "initial population" of configuration data it needs, if any, from the LDAP directory service. This step is described in greater detail in FIG. 8. At step 704 a client computer boots up and a particular user logs on. The client computer accesses the JSD server to retrieve its configuration data and configuration data for the particular user. A protocol for exchanging data between a client JSD schema and the server JSD schema is described in greater detail in U.S. patent application Ser. No. 09/079,499, filed May 14, 1998, entitled "A Protocol for Exchanging Configuration Data in a Computer Network," incorporated herein by reference.

At step 706 during normal user activity and client operations, the JSD server determines whether data requested or needed by a client is in the JSD server schema. If the configuration data needed by the client is available from the JSD server, the data is retrieved and control goes to step 710 where the data is transmitted to the client. If it is not available from the JSD server, control goes to step 708 where the data needed is located on the LDAP directory server. This process is described in greater detail in FIG. 10. A configuration data item can be located in a JSD server by identifying the appropriate namespace, either MACHINE or USER, and following categories until the correct leaf node containing the specific configuration data item is reached. For example, a "path" such as:

CONFIG/MACHINE/identifier/(MAC address)/(specific configuration properties)

Through a mapping process described below, a portion of this path is used to return data from the LDAP server to the JSD server schema. The data from the LDAP server is retrieved and transmitted to the JSD server schema. At step 710 the configuration data is transmitted to the client and the process is complete.

Figure 8:
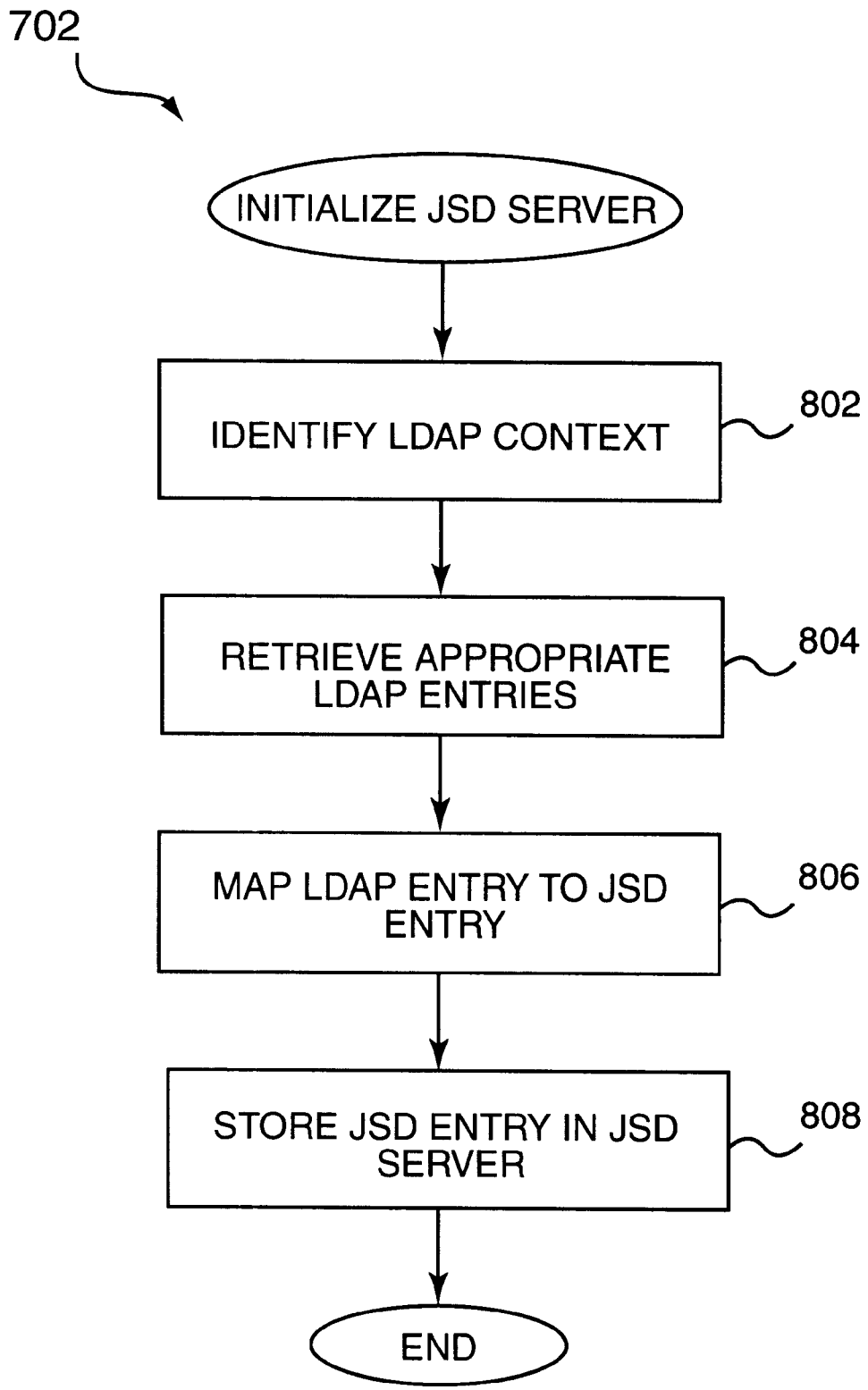
FIG. 8 is a flow diagram of a process for initializing the server JSD using an LDAP directory service in accordance with one embodiment of the present invention.

FIG. 8 is a flow diagram of a process for initializing a JSD server using an LDAP directory service in accordance with one embodiment of the present invention. It shows in greater detail step 702 of FIG. 7. At step 802 the JSD server determines the appropriate context in the LDAP directory from which data is to be imported in order to boot-up the JSD server. In the described embodiment, the LDAP directory has a context called "JSD" or other appropriate name that contains all the data a JSD server needs but does not already have to startup. In the described embodiment most of the data in the JSD USER namespace is populated from the DAP server. In other embodiments, a portion of the USER data may already reside on the JSD server. In other embodiments, JSD server start-up data can be distributed across more than one context in the LDAP directory. In yet other embodiments, the JSD server can already have most or all of the start up configuration data.

At step 804 the JSD server retrieves all the entries in the "JSD" context on the LDAP directory. In the described embodiment, the JSD server retrieves all the entries in the context. In other embodiments more or fewer entries in one or more contexts can be retrieved as needed by the JSD server. At step 806 the JSD paths corresponding to the attributes in the LDAP entries are retrieved. This process is described in greater detail in FIG. 11. At step 808 the configuration data is stored in the JSD entry determined at step 806 at which stage the process is complete.

FIG. 9A is an illustration showing a format of a user-specific configuration data leaf node in the JSD server and a user entry including attributes in an LDAP directory server in accordance with one embodiment of the present invention. The user-specific configuration data in the JSD server was initially described as node 607 in FIG. 6. FIG. 9A shows a list of JSD properties 902 for user "Jon" depicted in node 601 of FIG. 6. List 902 includes, by way of example, the user's logon_ID, address, email_address, user_ID, and department. The specific user configuration data items in leaf node 607 will depend on the specific needs of the users, the network, and the applications, and is not limited to the properties shown in list 902.

Also depicted in FIG. 9A is an LDAP entry 904 of type or DN u for the user Jonathan A. Smith. It is an enhancement or modification of entry 210 shown in FIG. 2A. Attribute list 212 is now shown as an enhanced attribute list 906 that includes additional "shadow attributes" for logon 908, mail 910, and computer 912. These shadow attributes are used during the "initial population" startup of the JSD server, a process for which is described in greater detail in FIG. 11. Briefly, the shadow attributes allow the LDAP server to rapidly perform the initial population of the JSD server schema, described initially at steps 806 and 808 of FIG. 8. Those attributes in the LDAP server that have a corresponding property in JSD server schema are given a "shadow." In the described embodiment, a shadow attribute contains the name of the corresponding JSD property, the JSD path where the property can be located, and the name of the Java class associated with the property.

In the described embodiment, a shadow attribute begins with a dot (.). In other embodiments other special characters or markers can be used to indicate a shadow attribute. Following the period is the name of the LDAP attribute that is being shadowed, such as "logon" or "mail." The LDAP attribute name is followed by the JSD property name. In shadow attribute 908, the property name is "logon_ID" which is the first JSD property in list 902. The order of the properties or of the shadow attributes are not significant and do not have a functional role in the described embodiment. After the JSD property name is the JSD path. In attribute 908 the path lies in the USER namespace ending with user "Jon."

The path name is followed by the Java class name for logon_ID. In attribute 912 the JSD property is client_ID corresponding to a computer serial number-type attribute in LDAP. The path for client_ID, because it relates to a particular machine, lies in the MACHINE namespace.

Figure 11:
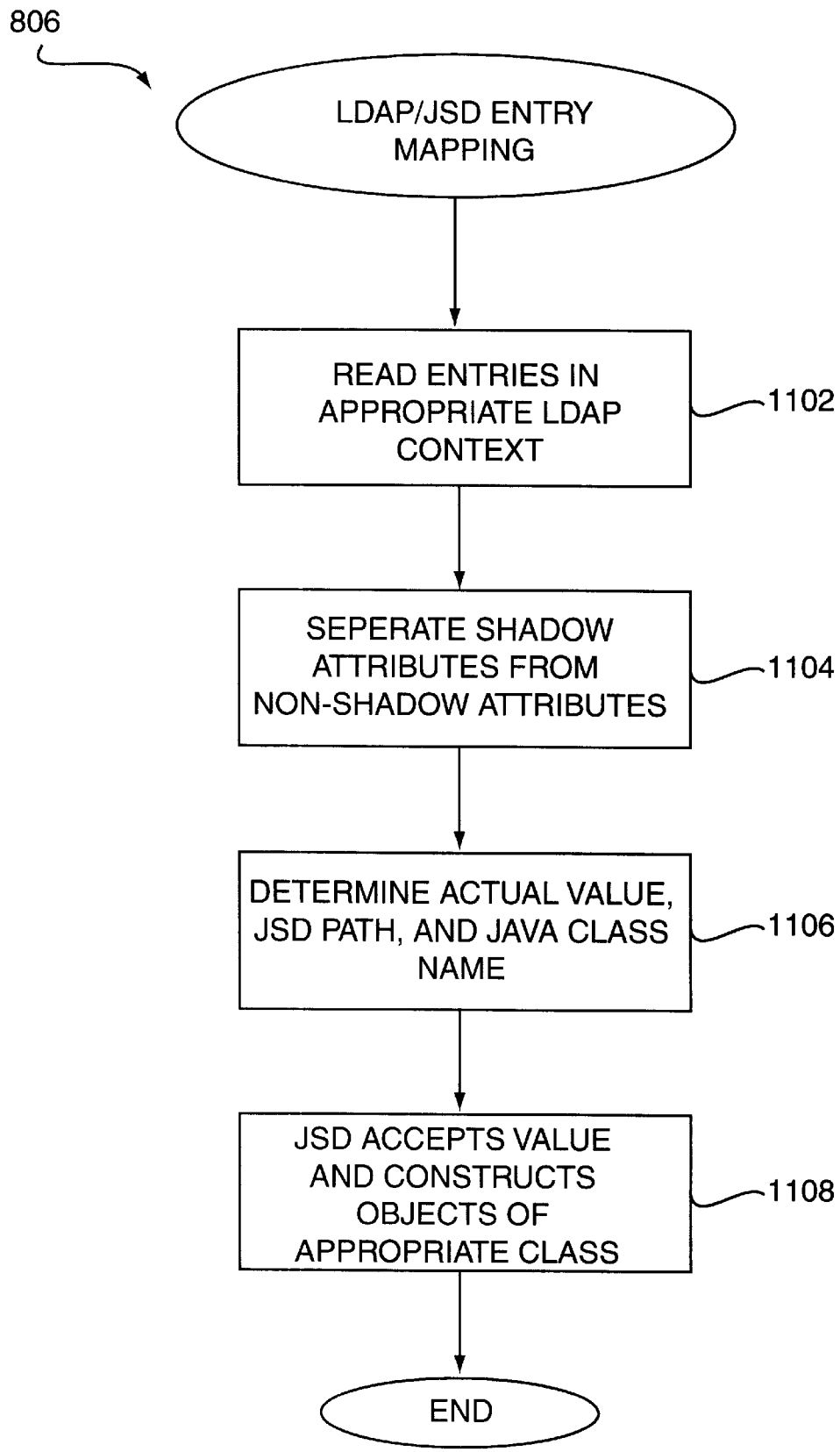
FIG. 11 is a flow diagram of a process in which an LDAP entry is mapped to a JSD entry in accordance with one embodiment of the present invention.

As described in greater detail in FIG. 11, when the JSD server schema is initially populated, the shadow attributes are used to rapidly identify exactly where in the JSD server schema a particular configuration data item should be stored. The actual value of the data item is obtained from the regular or "non-shadow" attribute in the entry. In the described embodiment, shadow entries are created manually by a network computer manager familiar with the JSD server schema. An individual with knowledge of the JSD schema and Java class names is able to identify those attributes in LDAP that have corresponding properties in the JSD schema. Such an individual can insert the shadow attributes into the LDAP entries. In the described embodiment, the shadow attributes are accessible to the JSD server and the JSD server has permission to read the shadow attributes.

FIG. 9B is an illustration of a format of an LDAP meta directory contained in the LDAP server in accordance with one embodiment of the present invention. LDAP meta directory 914 is a list of LDAP types or DNs, such as c, bu, and u, followed by a list of each associated attribute. Meta directory is used when the JSD server needs to retrieve a configuration data item from the LDAP server. It allows the LDAP server to quickly determine whether a particular type has a certain attribute. It is also beneficial to other legacy systems in the network that need access to data in the same LDAP context. Those systems can use meta directory 914 to determine exactly which attributes of a particular type are needed before accessing the entry. When retrieving the value from the entry, the legacy system can use the information it learned from the meta directory to extract only values for those attributes sought by the legacy system. It essentially uses the meta directory as a mask on the LDAP entry. This masking function is particularly useful given the addition of shadow attributes in the entries in that it decreases the chance of error in retrieving values for attributes that have shadow attributes.

FIG. 9C is an illustration of a format of a high-level path map component in accordance with one embodiment of the present invention. A high-level path map component 916 contains a mapping between each high-level JSD path and a corresponding LDAP hierarchical path consisting of distinguished names. In the described embodiment a high-level path in the JSD server schema begins with the root entry, referred to as CONFIG, followed by one of the two primary namespaces, MACHINE or USER, and ends with one of the five categories under the two namespaces. This mapping is used to limit the search performed in the LDAP server when the JSD server requests a data item it does not have as initially shown at step 708 in FIG. 7. Its role in retrieving data items in the LDAP server is described in greater detail in FIG. 10. In the described embodiment high-level path map is a component in a network computer administration tool that manages the LDAP directory service and is able to communicate with the JSD (i.e., is "JSD ware"). Thus, when the JSD requires a particular configuration data item from the LDAP server, it first accesses the high-level path map to determine which "branch" of the LDAP hierarchical structure to search using standard LDAP searching functions. The mapping between the JSD schema paths (all of which are well-defined) and the high-level DNs in the LDAP server is done by a network computer administrator familiar with both schemas.

Figure 10:
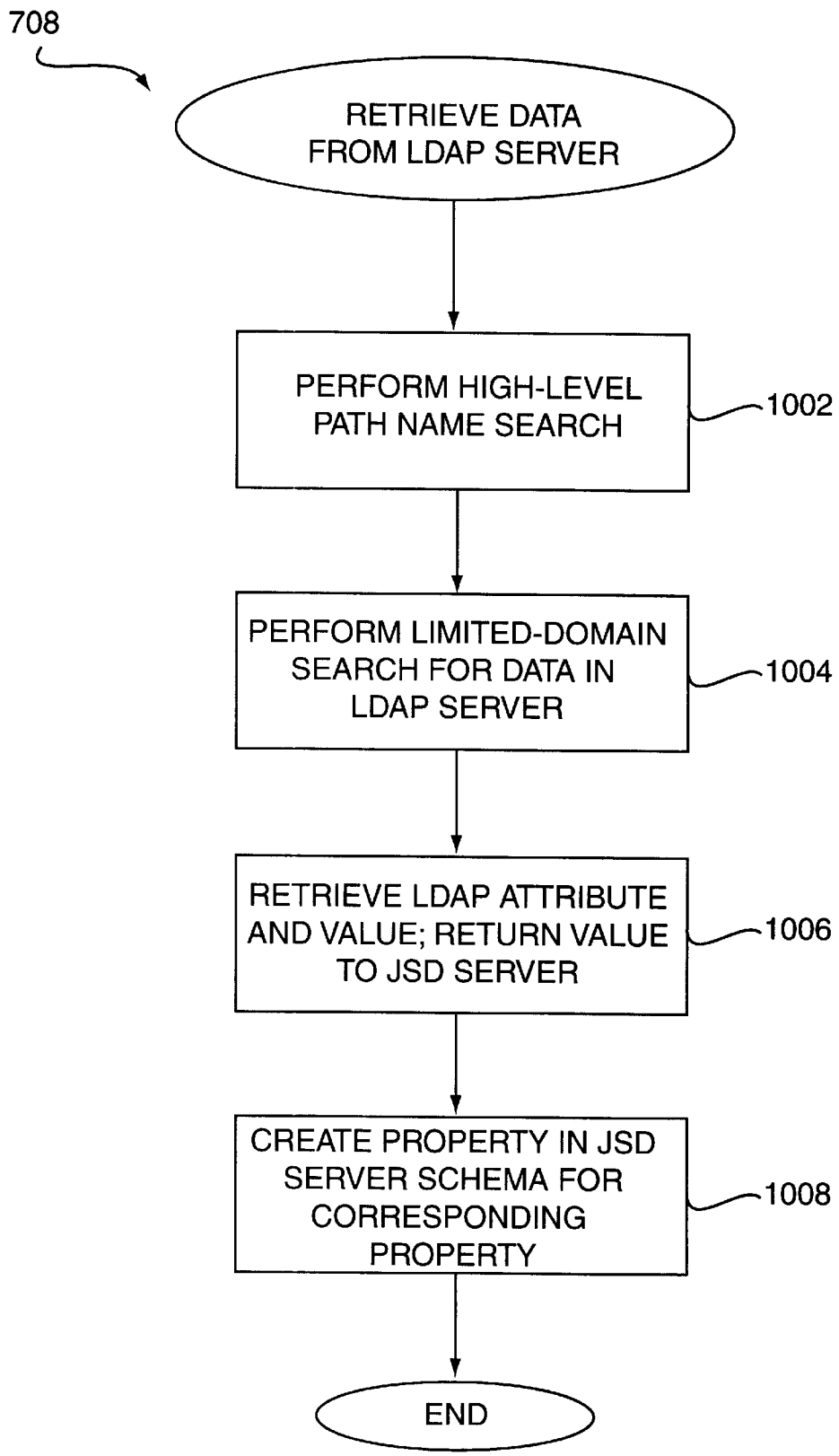
FIG. 10 is a flow diagram of a process for retrieving a configuration data item from the LDAP directory service when the data item is not available on the JSD server in accordance with one embodiment of the present invention.

FIG. 10 is a flow diagram of a process for retrieving a configuration data item from the LDAP directory service when the data item is not available on the JSD server in accordance with one embodiment of the present invention. FIG. 10 describes in greater detail step 708 of FIG. 7. At step 1002 the JSD server initiates a search for a match between high-level paths of the JSD server schema and the LDAP hierarchical structure using table 916 of FIG. 9C. For example, a user requests on a client computer is the last name only of a particular user, Jon Smith. The JSD server schema does not have a property that provides only the last name of a user. It determined this by traversing the path: CONFIG/USER/users/Jon/, and checking the user-specific configuration data for a property having only a last name.

At step 1002 a search is performed in path name table 916 of FIG. 9C for the high-level portion of the path: CONFIG/USER/users. A corresponding high-level LDAP path name represented by a series of DNs, such as bu=SunSoft; to o=Sun; to c=US, is identified. In the described embodiment, there are five possible high-level JSD path names: three in the MACHINE namespace (platform, identifier, and profile) and two in the USER namespace (users and groups). Once a corresponding LDAP high-level path name is identified, a search is performed in the LDAP database "under" the identified high-level path at step 1004. In the example above, this would be all the data below bu=SunSoft. The LDAP database searches for the last name attribute for user Jon Smith using LDAP cursor search mechanisms in LDAP. In the described embodiment, it uses meta directory 914 of FIG. 9B to determine whether the user type has an attribute corresponding to last name.

At step 1006, the LDAP server retrieves the "ln" attribute and its value, as shown in list 906 of FIG. 9A, and returns the data to the JSD server schema. At step 1008 the JSD server schema creates a property corresponding to the "ln" attribute and inserts the appropriate value. This data is then transmitted to the client which requested it and the process is complete. In the described embodiment, the configuration data item not initially on the JSD server and retrieved from the LDAP server is not only provided to the client as requested, but also used to update the JSD server.

FIG. 11 is a flow diagram of a process in which an LDAP entry is mapped to a JSD entry in accordance with one embodiment of the present invention. It describes step 806 of FIG. 8 in greater detail. This process uses the shadow attributes described initially in FIG. 9A in attribute list 906. Recall that FIG. 8 described a process for initializing the JSD server upon boot-up. In the described embodiment, in this process a significant portion of the USER namespace data in the JSD schema is populated with data from the LDAP server. In other embodiments some of the USER data can already be resident on the JSD server, as is the case with the MACHINE namespace data in the described embodiment. Because the volume of the MACHINE namespace data is significantly smaller than that of the USER namespace, it is feasible and efficient to keep that information on the JSD server. The USER namespace data typically resides in one LDAP context (e.g. "JSD" context) and is imported or cached into the JSD server.

At step 1102 the LDAP server reads each entry in the appropriate LDAP context or contexts. Because of the "lightweight" design and protocol of LDAP, this can be done rapidly. In the described embodiment, there is one context that contains all the configuration data needed to populate the USER namespace in the JSD server schema. At step 1104 the LDAP server distinguishes or separates shadow attributes and corresponding "non-shadow" attributes. This can also be done rapidly because the shadow attributes have a unique leading symbol, such as a dot, as shown in attributes 908, 910, and 912 of FIG. 9A. At step 1106 the LDAP server uses the non-shadow attribute to determine the actual value of the attribute or entry, such as "logon:jsmith", and the corresponding shadow attribute for instructions on where in the JSD server schema the value should be placed and the object type in which the value should be stored. At step 1108 the JSD server accepts the value and uses an appropriate object constructor to construct an object corresponding to the attribute value and stores the object in a leaf node at the bottom of the JSD path provided in the shadow attribute. By using the shadow attribute for the JSD location and the non-shadow attribute for the value, the LDAP allows the JSD server to avoid lengthy start-up times.

The present invention, relating primarily to software and data formatsor structures, employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data items, or the like. It should remembered, however, that all of these and similar terms are to be associated with the appropriate physical quantities and are merely convenient labels applied to these quantities.

The present invention also relates to a device, system or apparatus for performing the aforementioned operations, such as the JSD server and the LDAP server. These systems may be specially constructed for the required purposes, or they may be a general-purpose computer selectively activated or configured by a computer program stored in the computer or operating under a particular protocol, such as the Lighweight Directory Access Protocol (LDAP). The processes and data formats presented above are not inherently related to any particular computer or other computing apparatus. In particular, various general-purpose computers can be used with programs written in accordance with the teachings herein, or, alternatively, it may be more convenient to construct a more specialized computer system to perform the required operations, such as a server computer constructed to operate as a JSD server.

Figure 12:
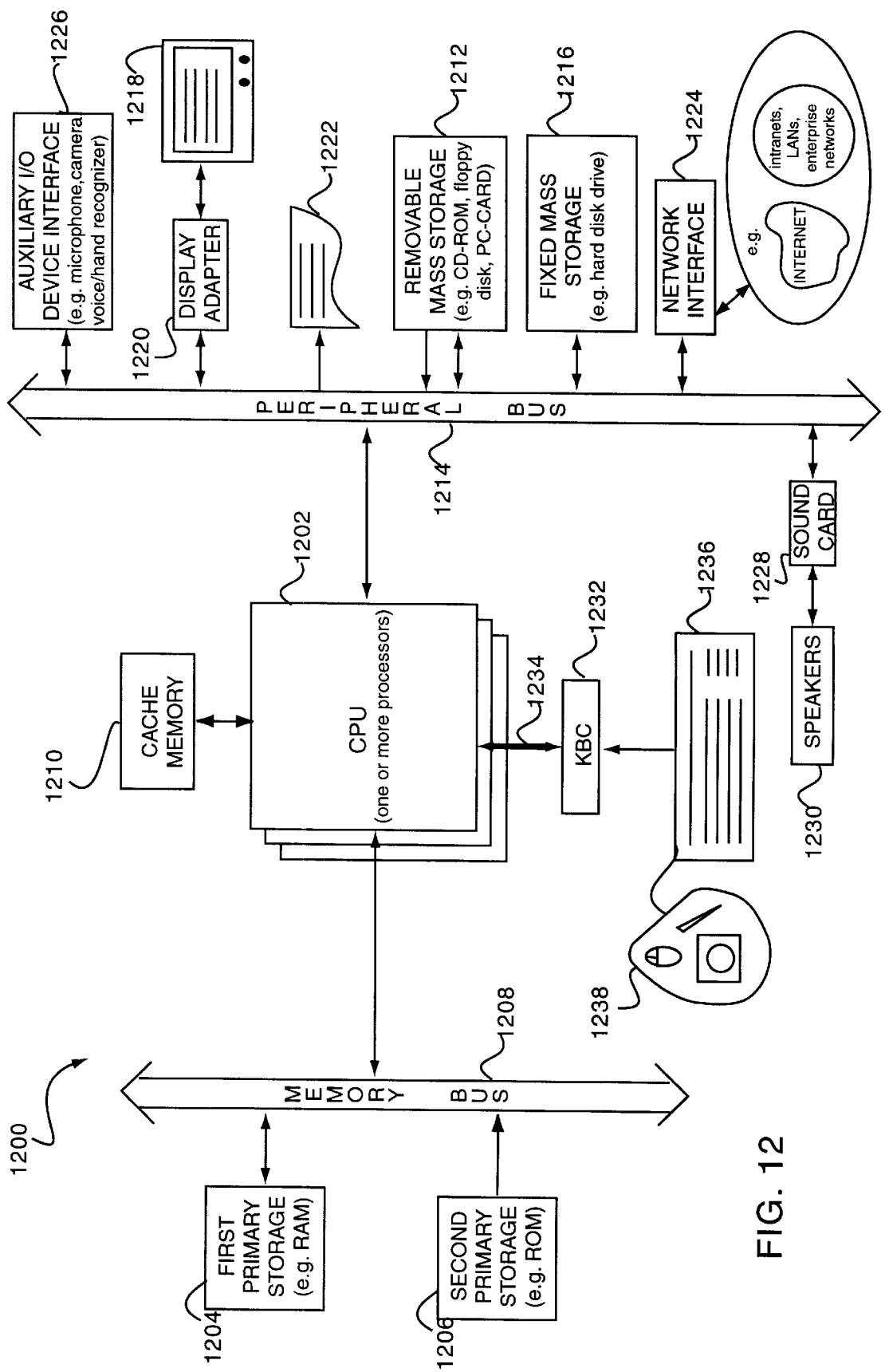
FIG. 12 is a block diagram of a typical computer system suitable for implementing an embodiment of the present invention.

FIG. 12 is a block diagram of a general-purpose computer system 1200 suitable for carrying out the processing in accordance with one embodiment of the present invention. FIG. 12 illustrates one embodiment of a general-purpose computer system that can be configured and enhanced to operate as a server computer, such as the LDAP directory server or the JSD server. Other computer system architectures and configurations can be used for carrying out the processing of the present invention. Computer system 1200, made up of various subsystems described below, includes at least one microprocessor subsystem (also referred to as a central processing unit, or CPU) 1202. That is, CPU 102 can be implemented by a single-chip processor or by multiple processors. CPU 102 is a general-purpose digital processor which controls the operation of the computer system 1200. Using instructions retrieved from memory, CPU 1202 controls the reception and manipulation of input data, and the output and display of data on output devices where appropriate.

CPU 1202 is coupled bi-directionally with a first primary storage 1204, typically a random access memory (RAM), and uni-directionally with a second primary storage area 1206, typically a read-only memory (ROM), via a memory bus 1208. As is well known in the art, primary storage 1204 can be used as a general storage area and as scratch-pad. memory, and can also be used to store input data and processed data. It can also store programming instructions and data, for example in the form of an enhanced LDAP attribute or entry or in the form of a JSD hierarchy as described in the figures above. This is in addition to other data and instructions for processes operating on CPU 1202, and is used typically used for fast transfer of data and instructions in a bi-directional manner over the memory bus 1208. Also as is well known in the art, primary storage 1206 typically includes basic operating instructions, program code, data and objects used by the CPU 1202 to perform its functions. Primary storage devices 1204 and 1206 may include any suitable computer-readable storage media, described below, depending on whether, for example, data access needs to be bi-directional or uni-directional. CPU 1202 can also directly and rapidly retrieve and store frequently needed data in a cache memory 1210.

A removable mass storage device 1212 provides additional data storage capacity for the computer system 1200, and is coupled either bi-directionally or uni-directionally to CPU 1202 via a peripheral bus 1214. For example, a specific removable mass storage device commonly known as a CD-ROM typically passes data uni-directionally to the CPU 1202, whereas a floppy disk can pass data bi-directionally to the CPU 1202. The data in the MACHINE namespace in the JSD server can be stored in removable mass storage device 1212 for example. Storage 1212 may also include computer-readable media such as magnetic tape, flash memory, signals embodied on a carrier wave, PC-CARDS, portable mass storage devices, holographic storage devices, and other storage devices. A fixed mass storage 1216 also provides additional data storage capacity and is coupled bi-directionally to CPU 1202 via peripheral bus 1214. The most common example of mass storage 1216 is a hard disk drive. Generally, access to these media is slower than access to primary storages 1204 and 1206. Mass storage 1212 and 1216 generally store additional programming instructions, data, and the like that typically are not in active use by the CPU 1202. It will be appreciated that the information retained within mass storage 1212 and 1216 may be incorporated, if needed, in standard fashion as part of primary storage 1204 (e.g. RAM) as virtual memory.

In addition to providing CPU 1202 access to storage subsystems, the peripheral bus 1214 is used to provide access to other subsystems and devices as well. In the described embodiment, these include a display monitor 1218 and adapter 1220, a printer device 1222, a network interface 1224, an auxiliary input/output device interface 1226, a sound card 1228 and speakers 1230, and other subsystems as needed.

The network interface 1224 allows CPU 1202 to be coupled to another computer, computer network, or telecommunications network using a network connection as shown. Through the network interface 1224, it is contemplated that the CPU 1202 might receive information, e.g., configuration data, requests for configuration data, or program instructions, from another network, or might output information to another network in the course of performing the above-described method steps. Information, often represented as a sequence of instructions to be executed on a CPU, can be received from and outputted to another network, for example, in the form of a computer data signal embodied in a carrier wave. An interface card or similar device and appropriate software implemented by CPU 1202 can be used to connect the computer system 1200 to an external network and transfer data according to standard protocols. That is, method embodiments of the present invention may execute solely upon CPU 1202, or may be performed across a network such as the Internet, intranet networks, or local area networks such as in an enterprise-wide network, in conjunction with a remote CPU that shares a portion of the processing. Additional mass storage devices (not shown) may also be connected to CPU 1202 through network interface 1224.

Auxiliary I/O device interface 1226 represents general and customized interfaces that allow the CPU 1202 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1202 is a keyboard controller 1232 via a local bus 1234 for receiving input from a keyboard 1236 or a pointer device 1238, and sending decoded symbols from the keyboard 1236 or pointer device 1238 to the CPU 1202. The pointer device can be a mouse, stylus, track ball, or tablet, and is useful for interacting with a graphical user interface.

In addition, embodiments of the present invention further relate to computer storage products including a computer readable medium that contains program code for performing various computer-implemented operations. The computer-readable medium is any data storage device that can store data which can thereafter be read by a computer system. The media and program code may be those specially designed and constructed for the purposes of the present invention, such as retrieving configuration data from theLDAP server, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1208, peripheral bus 1214, and local bus 1234 are illustrative of any interconnection scheme serving to link the subsystems. For example, a local bus could be used to connect the CPU to fixed mass storage 1216 and display adapter 1220. The computer system shown in FIG. 12 is but an example of a computer system suitable for use with the invention. Other computer architectures having different configurations of subsystems, such as those of server computers, can also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the invention is described using configuration data, other types of non-configuration data can also be stored in the Java system database and accessed from LDAP directory services in networks where the LDAP database stores non-configuration type data. In another example, some of the USER namespace configuration data can reside persistently on the JSD server thus not having to import or cache such data from the LDAP server upon JSD server start-up. In yet another example, a configuration repository other an the JSD server schema described can be used to store configuration data. The concept of the shadow attributes and high-level path mapping can be used in conjunction with another type of configuration repository. Accordingly, the present embodiments are to be considered as illustrative and not restrictive, and the invention is not to be limited to the details given herein, but may be modified within the scope and equivalents of the appended claims.

What is claimed is:

1. An extension to a directory service enabling a mapping between a directory attribute and a configuration server property, the extension comprising:

a directory entry including one or more shadow attributes, each shadow attribute corresponding to a particular standard directory attribute wherein the particular standard directory attribute has a corresponding property in a configuration server; and a directory address and configuration server location identifier correspondence file containing matches between a directory address and a configuration server location identifier.

2. An extension to a directory service as recited in claim 1 further comprising:

an directory service meta directory containing a type list of one or more directory types; and an attribute list of one or more attributes available for each directory type.

3. An extension to a directory service as recited in claim 2 wherein each directory type is a directory service distinguished name.

4. An extension to a directory service as recited in claim 1 wherein each shadow attribute includes a corresponding configuration server property and a configuration server location identifier.

5. An extension to a directory service as recited in claim 4 wherein each shadow attribute further includes a class name associated with the corresponding configuration server property.

6. An extension to a directory service as recited in claim 1 wherein the configuration server is a Java system database server containing configuration data for a plurality of clients and a plurality of network users.

7. An extension to a directory service as recited in claim 1 wherein each shadow attribute is proceeded by a marker indicating the attribute as a shadow attribute.

8. An extension to a directory service as recited in claim 4 wherein the configuration server location identifier is a series of nodes where each nodes represents a category of information.

9. An extension to a directory service as recited in claim 1 wherein the directory service is the Lighweight Directory Access Protocol.

10. An attribute format for a shadow attribute in a directory service capable of operating with a configuration database, the format comprising:
  a configuration database property field for storing a property name used in the configuration database;
  a configuration database location field for storing a location identifier used for traversing the configuration database; and
  a marker associated with the shadow attribute to identify it as a shadow attribute.

11. An attribute format for a shadow attribute as recited in claim 10 further comprising a configuration database class name field for storing a class name associated with a value to be stored in the configuration database.

12. An attribute format for a shadow attribute as recited in claim 10 wherein the location identifier is a series of nodes in a hierarchical structure.

13. An attribute format for a shadow attribute as recited in claim 10 wherein the directory service is the Lighweight Directory Access Protocol and the configuration database is a Java system database.

14. A method of sending data from a network directory service to a configuration database, the method comprising:
  retrieving one or more regular directory service entries and corresponding values from the network directory service to be transmitted to the configuration database;
  determining a location and property name in the configuration database for each corresponding value by querying a shadow directory service entry in the network directory service; and
  storing the corresponding values in the configuration database based on the location determined from the shadow directory service entry.

15. A method as recited in claim 14 further comprising determining a context in the network directory service from which to retrieve the one or more directory service entries and corresponding values.

16. A method as recited in claim 14 further comprising distinguishing each regular directory service entry from each shadow directory service entry.

17. A method as recited in claim 14 wherein the shadow directory service entry contains a path on the configuration database and a property name associated with the configuration database.

18. A method as recited in claim 17 wherein the shadow directory service entry further contains a class name.

19. A method of retrieving data from an LDAP server to a Java-based configuration server, the method comprising:
  searching a location matching file for a match between a high-level path in a Java-based configuration server and a particular LDAP address;
  searching a portion of the LDAP server for one or more attributes using the particular LDAP address to determine the portion of the LDAP server to searched;
  retrieving one or more values corresponding to the one or more attributes; and
  transmitting the one or more values to the Java-based configuration server such that the one or more values are made available to client computers in a Java operating system environment.

20. A method as recited in claim 19 wherein searching a location matching file further comprises accessing a network computer management tool containing the location matching file.

21. A method as recited in claim 19 wherein searching a portion of the LDAP server further comprises invoking an LDAP search function and passing an LDAP attribute as a parameter.

22. A method as recited in claim 19 wherein the location matching file includes a plurality of paths in the Java-based configuration server and a corresponding plurality of LDAP addresses.

23. A computer program product for retrieving data from an LDAP server to a Java-based configuration server, the computer program product comprising:
  a computer code that searches a location matching file for a match between a high-level path in a Java-based configuration server and a particular LDAP address;
  a computer code that searches a portion of the LDAP server for one or more attributes using the particular LDAP address to determine the portion of the LDAP server to searched; and
  a computer code that retrieves one or more values corresponding to the one or more attributes;
  a computer code that transmits the one or more values to the Java-based configuration server such that the one or more values are made available to client computers in a Java operating system environment; and
  a computer-readable medium that stores the computer codes.

24. A computer program product for sending data from a network directory service to a configuration database, the computer program product comprising:
  a computer code that retrieves one or more regular directory service entries and corresponding values from the network directory service to be transmitted to the configuration database;
  a computer code that determines a location and a property name in the configuration database for each corresponding value by querying a shadow directory service entry in the network directory service;
  a computer code that stores the corresponding values in the configuration database based on the location determined from the shadow directory service entry; and a computer-readable medium that stores the computer codes.

* * * * *